(12) United States Patent
Huang

(10) Patent No.: US 10,995,243 B2
(45) Date of Patent: May 4, 2021

(54) ADHESIVE COMPOSITION, ADHESIVE COMPRISING THE SAME, AND CURED PRODUCT THEREOF

(71) Applicant: Microcosm Technology Co., LTD, Tainan (TW)

(72) Inventor: Tang-Chieh Huang, Tainan (TW)

(73) Assignee: Microcosm Technology Co., Ltd., Tainan (TW)

( * ) Notice: Subject to any disclaimer, the term of this patent is extended or adjusted under 35 U.S.C. 154(b) by 56 days.

(21) Appl. No.: 16/206,977

(22) Filed: Nov. 30, 2018

(65) Prior Publication Data
US 2019/0367779 A1    Dec. 5, 2019

(30) Foreign Application Priority Data

May 30, 2018    (TW) .................................. 107118532

(51) Int. Cl.
*C09J 7/30*     (2018.01)
*C09J 11/04*    (2006.01)
*C09J 163/00*   (2006.01)

(52) U.S. Cl.
CPC ................ *C09J 7/30* (2018.01); *C09J 11/04* (2013.01); *C09J 163/00* (2013.01); *C09J 2463/00* (2013.01); *C09J 2479/08* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,108,825 | A | * | 4/1992 | Wojnarowski | C08L 63/00 257/E23.167 |
| 5,643,986 | A | * | 7/1997 | Ishikawa | C08K 3/30 524/104 |
| 5,677,393 | A | * | 10/1997 | Ohmori | B32B 7/12 525/423 |
| 5,942,592 | A | * | 8/1999 | Zhao | C09J 183/10 528/26 |
| 6,117,510 | A | * | 9/2000 | Ishikawa | C09J 7/0242 428/355 EP |
| 6,632,523 | B1 | * | 10/2003 | Rosenfeld | C09D 179/08 428/355 R |
| 2001/0053426 | A1 | * | 12/2001 | Kamoi | C08G 59/226 428/1.53 |
| 2005/0065296 | A1 | * | 3/2005 | Kozakai | C09J 163/00 525/530 |
| 2005/0181215 | A1 | * | 8/2005 | Suzuki | B32B 15/08 428/418 |
| 2010/0012362 | A1 | * | 1/2010 | Abe | C08G 59/4042 174/259 |
| 2010/0056730 | A1 | * | 3/2010 | Yoneda | C08G 59/4042 525/408 |
| 2012/0256326 | A1 | * | 10/2012 | Mitsukura | H01L 24/83 257/798 |
| 2016/0198570 | A1 | * | 7/2016 | Yonezawa | C08L 63/00 428/209 |
| 2017/0362472 | A1 | * | 12/2017 | Matsumura | C09J 163/00 |
| 2018/0022976 | A1 | * | 1/2018 | Du | C09J 179/08 523/400 |
| 2018/0244964 | A1 | * | 8/2018 | Yang | C08L 67/02 |

FOREIGN PATENT DOCUMENTS

| | | | | |
|---|---|---|---|---|
| JP | 11048425 | A | * | 2/1999 |
| JP | 11048426 | A | * | 2/1999 |
| JP | 11099363 | A | * | 4/1999 |
| JP | 2005330493 | A | * | 12/2005 |
| WO | WO-2012081771 | A1 | * | 6/2012 ............. C09J 11/06 |

OTHER PUBLICATIONS

Machine translation of JP 2005330493 A, retrieved Sep. 2020 (Year: 2020).*

* cited by examiner

*Primary Examiner* — Nicole M. Buie-Hatcher

(74) *Attorney, Agent, or Firm* — Haverstock & Owens LLP

(57) ABSTRACT

The present invention relates to an adhesive composition, which comprises an epoxy resin; and a polyimide comprising a repeating unit. The repeating unit comprises a first repeating unit represented by formula (1) and a second repeating unit represented by formula (2):

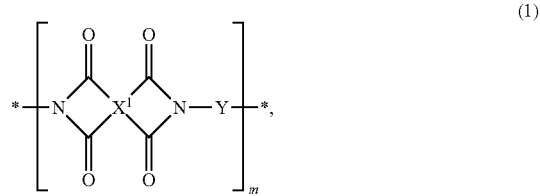

(1)

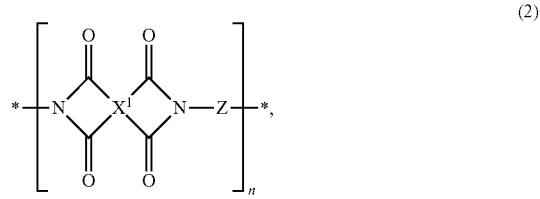

(2)

wherein $X^1$, Y, Z, m, and n are as defined herein, the weight ratio of polyimide to the total amount of the epoxy resin is 50% to 100%, and in the epoxy resin, the proportion of the epoxy resin having a weight average molecular weight of less than 400 Da accounts for 12 to 40% by weight of the total amount of the epoxy resin. The adhesive formed by the adhesive composition of the present invention has a relatively high glass transition temperature.

17 Claims, 3 Drawing Sheets

ADHESIVE COMPOSITION, ADHESIVE COMPRISING THE SAME, AND CURED PRODUCT THEREOF

BACKGROUND OF THE INVENTION

Field of the Invention

The present invention relates to an adhesive composition and, in particular, to an adhesive composition that can form an adhesive having a relatively high glass transition temperature.

Description of the Prior Art

Currently, there are two series of adhesives commonly used in flexible circuit boards, i.e. rubber and acrylic. Among them, the commonly used rubber series has excellent adhesion and compatibility, but its glass transition temperature (Tg)) is usually below 70° C., which means that in general machining or high temperature processing, the adhesive layer has a softening phenomenon, so the mechanical force tends to cause deformation, pulling and peeling phenomena of the adhesive layer during processing, which leads defect occurrence in the adhesive layer of the circuit board stack, causing the problem of low yield.

In addition, the glass transition temperature of the conventional adhesive is not high, so there may be problems of poor environmental resistance, such as poor resistance to temperature and humidity, which may lead to the use of functionally defective products by consumers during use.

SUMMARY OF THE INVENTION

In view of the above, it is an object of the present invention to provide an adhesive composition, which can form an adhesive that is effective in solving the problem of product instability existing in the prior art.

In order to achieve the above object, the adhesive composition provided by the present invention comprises an epoxy resin; and a polyimide comprising a repeating unit, wherein the repeating unit comprises a first repeating unit represented by formula (1) and a second repeating unit represented by formula (2):

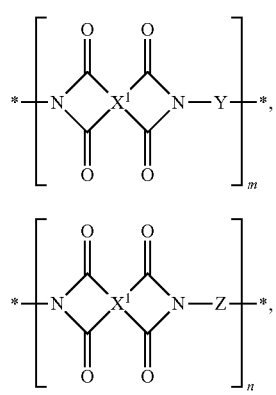

wherein m and n are each independently an integer of 1 to 300, m+n is an integer of 2 to 300, and each $X^1$ is independently a tetravalent organic group having an alicyclic compound group or an aromatic ring group in a main chain moiety, Y of formula (1) is a divalent organic group containing a siloxane group in a main chain moiety, Z of formula (2) is a divalent organic group containing a phenolic hydroxyl group, a carboxyl group, or an ether group in a branched chain moiety, "*" indicates a linking point, the weight ratio of polyimide to the total amount of the epoxy resin is 50% to 100%, and in the epoxy resin, the proportion of the epoxy resin having a weight average molecular weight of less than 400 Da accounts for 12 to 40% by weight of the total amount of the epoxy resin.

Preferably, the repeating unit further comprises a third repeating unit represented by formula (3), a fourth repeating unit represented by formula (4), or both the third repeating unit represented by formula (3) and the fourth repeating unit represented by formula (4):

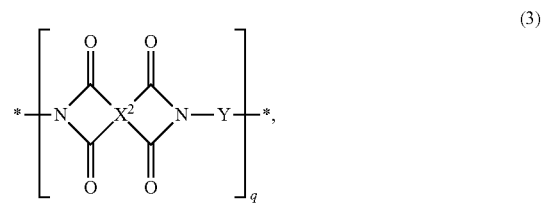

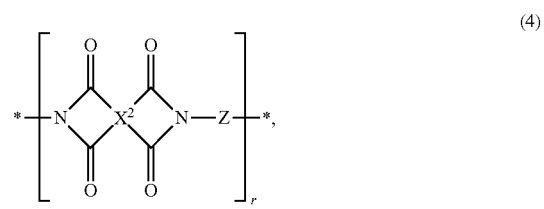

wherein q and r are each independently an integer of 0 to 300, q+r is an integer of 1 to 300, each $X^2$ is independently a tetravalent organic group having an aromatic ring structure in a main chain moiety, Y of formula (3) is a divalent organic group containing a siloxane group in a main chain moiety, Z of formula (4) is a divalent organic group containing a phenolic hydroxyl group, a carboxyl group, or an ether group in a branched chain moiety, and "*" indicates a linking point.

Preferably, each $X^1$ is independently selected from

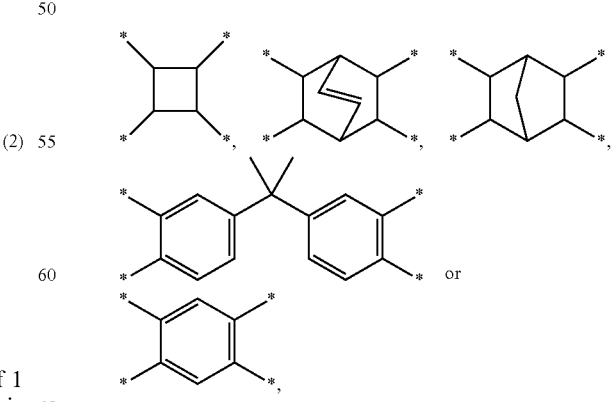

wherein "*" indicates a linking point.

Preferably, each X² is independently selected from
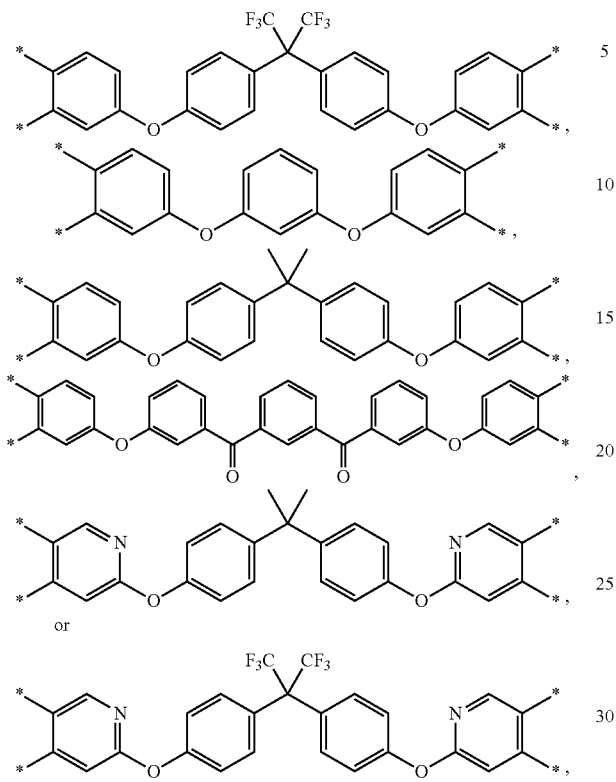
wherein "*" indicates a linking point.
Preferably, each Y is independently selected from
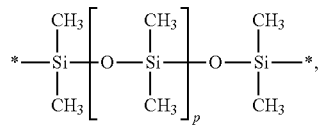
wherein p is an integer of 0 to 20, and "*" indicates a linking point.
Preferably, each Z is independently selected from
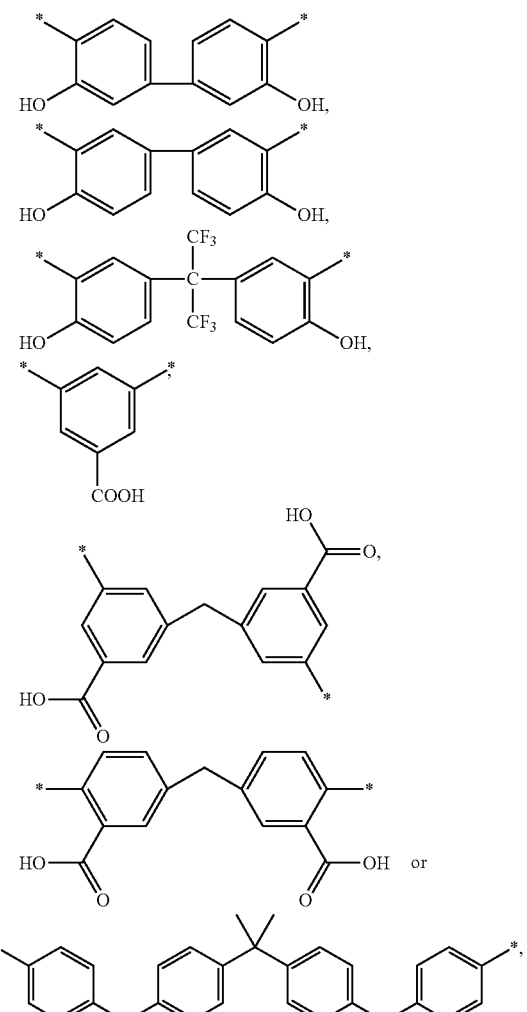
wherein "*" indicates a linking point.
Preferably, the epoxy resin is selected from
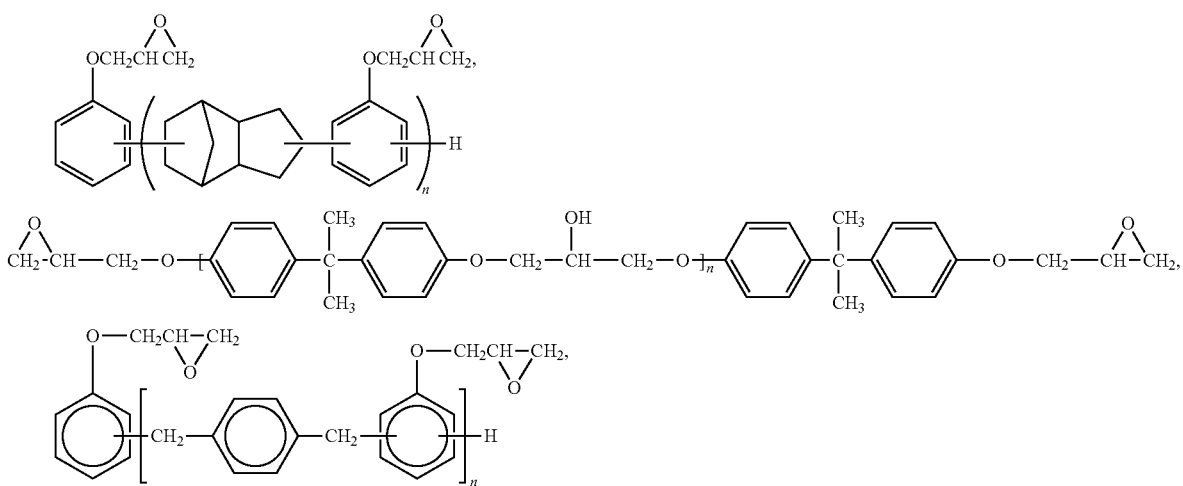

-continued

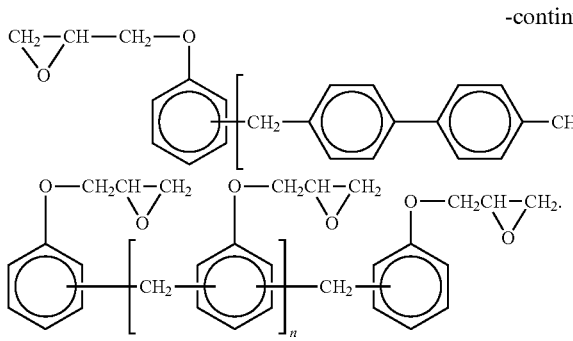

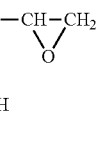

or wherein n is an integer of 1 to 30.

Preferably, the adhesive composition further comprises a curing agent.

Preferably, the adhesive composition further comprises an inorganic filler. More preferably, the inorganic filler is selected from silicon dioxide, boron nitride, mica, and aluminum hydroxide.

The present invention also provides an adhesive formed by the adhesive composition described above.

Preferably, the adhesive is in the form of a sheet or a film.

The present invention further provides a cured product formed by curing the adhesive composition described above.

The adhesive composition of the present invention mainly improves the glass transition temperature of the resulting adhesive by using a specific polyimide, thereby solving the problem of low yield due to poor material properties or insufficient stability during processing of the electronic component, and increasing consumer's reliability regarding the adhesive's environmental resistance, such as resistance to temperature and humidity.

DETAILED DESCRIPTION OF THE EMBODIMENTS

Figure 1:
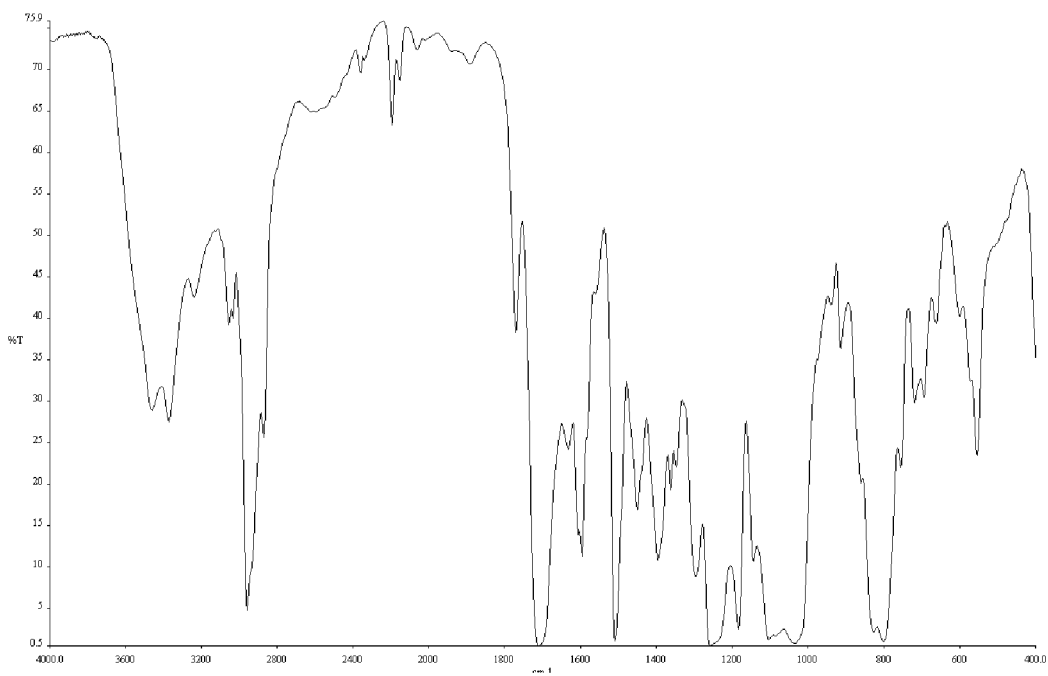
FIG. 1 is an infrared spectrum of the sheet-like adhesive of Example 1 of the present invention.

The present invention provides an adhesive composition which can be applied to a multilayer board stack assembly of a general circuit board, a flexible printed circuit board, a soft and hard bonding board, a carrier board, a quasi-carrier board, and the like. In the circuit board stack structure, the insulating layer may comprise a glass fiber, a polyimide, an adhesive, or the like, and the physical property of the adhesive is the weakest one in the insulating layers. Therefore, by increasing the glass transition temperature of the adhesive, the stability during processing of the electronic components having a multilayer board stack structure can be greatly improved. Even more, because of the increase in overall heat resistance, the process parameter adjustment range can be expanded to further improve product output efficiency and product stability.

The adhesive composition provided by the present invention comprises an epoxy resin; and a polyimide comprising a repeating unit, wherein the repeating unit comprises a first repeating unit represented by formula (1) and a second repeating unit represented by formula (2):

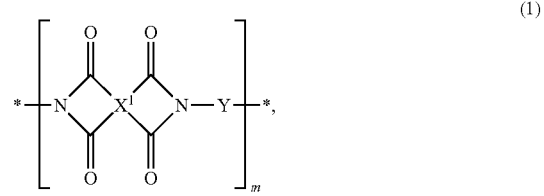

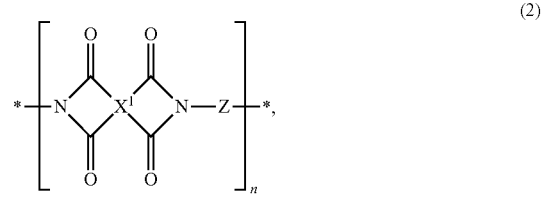

wherein m and n are each independently an integer of 1 to 300, such as 25, 50, 75, 100, 125, 150, 175, 200, 225, 250, and 275; m+n is an integer of 2 to 300, such as 50, 75, 100, 125, 150, 175, 200, 225, 250, and 275; each $X^1$ is independently a tetravalent organic group having an alicyclic compound group or an aromatic ring group in a main chain moiety, Y of formula (1) is a divalent organic group containing a siloxane group in a main chain moiety, Z of formula (2) is a divalent organic group containing a phenolic hydroxyl group, a carboxyl group, or an ether group in a branched chain moiety, "*" indicates a linking point, the weight ratio of polyimide to the total amount of the epoxy resin is 50% to 100%, and in the epoxy resin, the proportion of the epoxy resin having a weight average molecular weight of less than 400 Da accounts for 12 to 40% by weight of the total amount of the epoxy resin.

The repeating unit preferably further comprises a third repeating unit represented by formula (3), a fourth repeating unit represented by formula (4), or both the third repeating unit represented by formula (3) and the fourth repeating unit represented by formula (4):

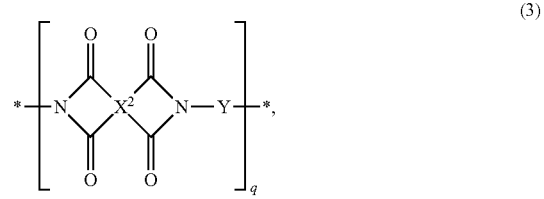

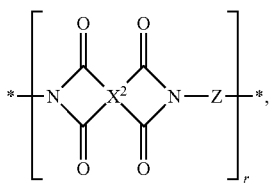

(4)

wherein q and r are each independently an integer of 0 to 300, such as 25, 50, 75, 100, 125, 150, 175, 200, 225, 250, and 275; q+r is an integer of 1 to 300, such as 50, 75, 100, 125, 150, 175, 200, 225, 250, and 275; each $X^2$ is independently a tetravalent organic group having an aromatic ring structure in a main chain moiety, Y of formula (3) is a divalent organic group containing a siloxane group in a main chain moiety, Z of formula (4) is a divalent organic group containing a phenolic hydroxyl group, a carboxyl group, or an ether group in a branched chain moiety, and "*" indicates a linking point.

In addition, it should be understood by those skilled in the art that, under the circumstance that the polyimide of the present invention comprises the first repeating unit represented by formula (1) and the second repeating unit represented by formula (2), the first repeating unit and the second repeating unit may be randomly intersected and arranged, and not only the regular arrangement in which the consecutive m first repeating units are connected to the consecutive n second repeating units. Similarly, under the circumstance that the polyimide of the present invention comprises the first repeating unit represented by formula (1), the second repeating unit represented by formula (2), and the third repeating unit represented by formula (3) (or the fourth repeating unit represented by formula (4)), the first repeating unit, the second repeating unit, and the third repeating unit (or the fourth repeating unit) may be randomly intersected and arranged, and not only the regular arrangement in which the consecutive m first repeating units, the consecutive n second repeating units, and the consecutive q third repeating units (or the consecutive r fourth repeating units) are connected. Similarly, under the circumstance that the polyimide of the present invention comprises the first repeating unit represented by formula (1), the second repeating unit represented by formula (2), the third repeating unit represented by formula (3), and the fourth repeating unit represented by formula (4), the first repeating unit, the second repeating unit, the third repeating unit, and the fourth repeating unit may be randomly intersected and arranged, and not only the regular arrangement in which the consecutive m first repeating units, the consecutive n second repeating units, the consecutive q third repeating units, and the consecutive r fourth repeating units are connected.

In the present invention, the polyimide is preferably soluble in a solvent, which includes but is not limited to N-methylpyrrolidone (NMP), dimethylacetamide (DMAc), or tetrahydrofuran (THF).

In the present invention, each $X^1$ may be the same or different; each $X^2$ may be the same or different; each Y may be the same or different; and each Z may be the same or different.

Each $X^1$ is preferably independently selected from

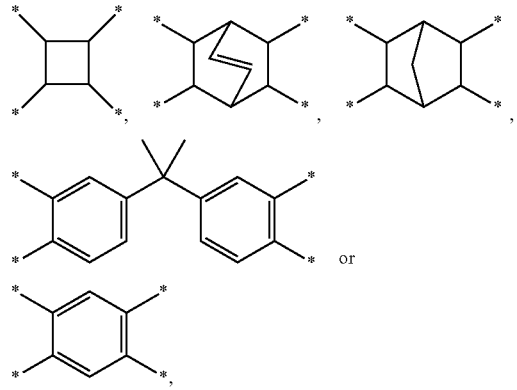

wherein "*" indicates a linking point.

Each $X^2$ is preferably independently selected from

[structures shown]

wherein "*" indicates a linking point.

Each Y is preferably independently selected from

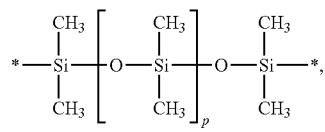

wherein p is an integer of 0 to 20, such as 3, 6, 9, 12, 15, and 18; and "*" indicates a linking point.

Each Z is preferably independently selected from

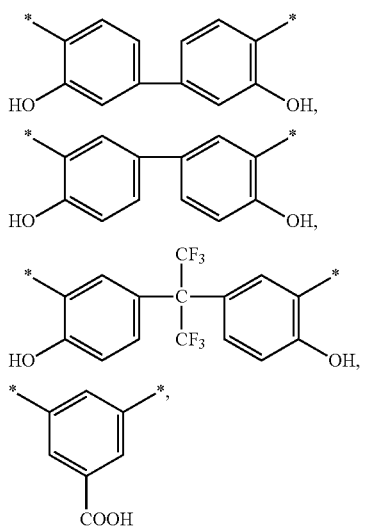

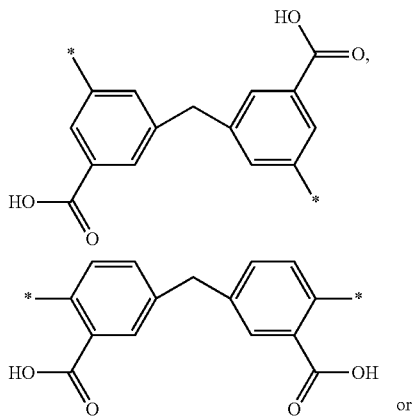

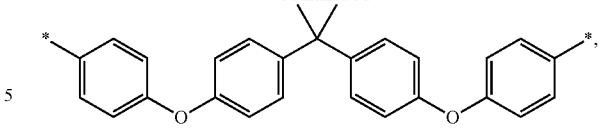

or wherein "*" indicates a linking point.

The adhesive having a high glass transition temperature of the present invention utilizes a specific polyimide molecular arrangement design to achieve a bond strength comparable to that of the rubber and acrylic series. Also, it has higher heat resistance, solvent resistance, and reliability of environmental resistance. Furthermore, the polyimide of the present invention can adjust the type and ratio of the reactive functional groups in the molecular chain through the structure design of the dianhydride and the diamine monomers, so that it has excellent compatibility with other substances, including epoxy resin, dianhydride or diamine type curing agent, inorganic filler, flame retardant, ion inhibitor, dispersant, leveling agent, catalyst, etc., all of which can be fully mixed with the polyimide of the present invention to achieve the purpose of fine-tuning of the adhesive properties.

The polyimide of the present invention is obtained by the reaction of the reaction components containing a dianhydride and a diamine. The dianhydride suitable for use in the present invention includes, but is not limited to, cyclobutane-1,2,3,4-tetracarboxylic dianhydride, bicyclooctanetetracarboxylic dianhydride, bicyclo[2.2.2]-oct-7-ene-2,3,5,6-tetracarboxylic dianhydride, 4,4'-bisphenol A dianhydride, and pyromellitic dianhydride. The diamine suitable for use in the present invention includes, but is not limited to, 1,3-bis(3-aminopropyl)-1,1,3,3-tetramethyldisiloxane, 3,5-diaminobenzoic acid, 3,3'-dihydroxy-4,4'-biphenyldiamine, 3,3'-diamino-4,4'-biphenyldiol, 6,6'-diamino-3,3'-methylenedibenzoic acid, 6,6'-methylenebis(2-amino benzoic acid), and 2,2-bis[4-(4-aminophenoxy)phenyl] propane.

The epoxy resin suitable for use in the present invention is not particularly limited, and those of ordinary skill in the art to which the invention pertains may select an appropriate epoxy resin according to their needs. Examples of the epoxy resin include, but are not limited to:

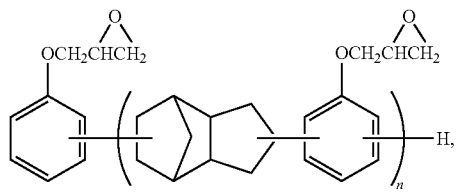

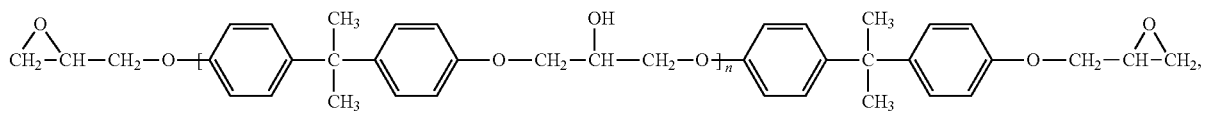

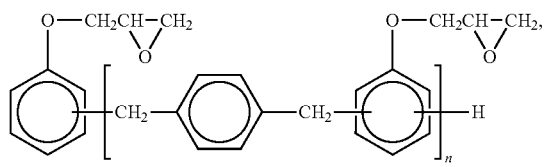

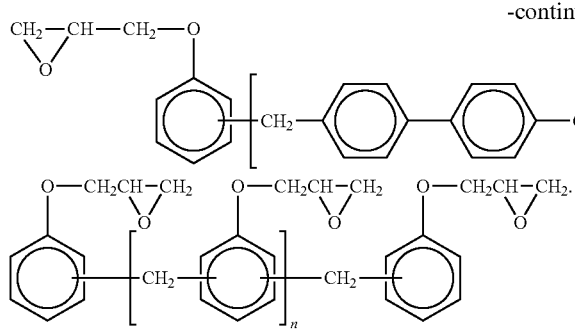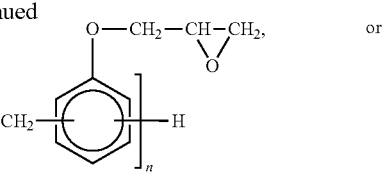

The polyimide used in the present invention can be crosslinked with an epoxy resin because of the reactive functional group on its molecular chain, so that the adhesive properties described above can be produced without using the curing agent. If necessary, an additional curing agent, such as the diamine or the dianhydride, may be added to the composition to adjust the reaction behaviors, such as crosslinking density and rate, at the time of high temperature curing. In addition to adjusting the physical properties of the adhesive, the processing parameters can be effectively adjusted to meet the equipment capacity limitations of various manufacturers.

The use of the inorganic filler in the adhesive is a relatively common method, and the adhesive composition of the present invention can also change the physical properties, such as the adhesion, thermal expansion coefficient, machinability, flame retardancy, thermal conductivity, heat resistance, solvent resistance, rheology, etc. of the adhesive formed by additionally adding the inorganic filler. For example, the addition of silicon dioxide can affect the above properties, including reducing the adhesion of the adhesive to the release material after removal of the solvent. If a die punching step is required before the lamination process during the adhesive processing, such inorganic filler may be added to increase the brittleness of the material and make the pore shape more complete after processing. If a certain amount or more of silicon dioxide is added, it may also have an effect on lowering the coefficient of thermal expansion and adjusting the glass transition temperature, but when an excessive amount of silicon dioxide is added, it is inevitably to lower the bonding strength and change the rheology of the adhesive, possibly resulting in the phenomena of so-called lamination blistering, popcorn, etc. due to the poor filling of adhesive in the etching circuit during the high temperature lamination. Further, for example, the addition of aluminum hydroxide to the adhesive composition can effectively improve the flame retardancy of the adhesive. It is because aluminum hydroxide can be converted into alumina and releases water molecules during high-temperature combustion, thereby suppressing flame burning. Similarly, when the aluminum hydroxide is added in excess, it may cause other physical properties to change. Therefore, depending on the needs of the user, the adhesive composition of the present invention may or may not be added with the inorganic filler. Examples of the inorganic filler include, but are not limited to, silicon dioxide, boron nitride, mica or aluminum hydroxide. As for the addition amount of the inorganic filler, it is necessary to take into consideration of the balance of various characteristics. Generally, the inorganic filler is preferably added in an amount of 5 to 30% by weight based on the total weight of the composition.

The adhesive composition of the present invention may or may not be added with other additives, such as a flame retardant, an ion inhibitor, a dispersant, a leveling agent or a catalyst. By adding these additives, the characteristics emphasized by the various additives can be enhanced for the adhesive of the present invention. Although the adhesive of the present invention is different from the adhesive of rubber and acrylic systems, there is no problem of poor ion migration resistance caused by excessive ion content, but if the adhesive is applied to higher order electronic products, for example, in the field of IC carrier board, quasi-carrier board, etc., the line width of the etching line will be greatly reduced from about 50 μm of the general circuit board to 30 μm or less, and a small amount of ion migration may cause a short circuit. In this case, an ion inhibitor can be added to the adhesive composition to reduce the ion concentration in the adhesive, and to avoid the short circuit phenomenon of the fine lines in the circuit board during the long-term use of the electronic product.

The present invention also provides an adhesive formed from the above-mentioned adhesive composition, which is preferably in the form of a sheet or a film.

The present invention further provides a cured product formed by curing the above-mentioned adhesive composition.

In order to highlight the efficacy of the present invention, the inventors have completed the examples and comparative examples in the manners set forth below. The following examples and comparative examples show the experimental data provided by the inventors and are not within the scope of the prior art. The invention is further illustrated by the following examples, which are not intended to limit the scope of the invention, and all the changes and modifications made by those skilled in the art without departing from the spirit of the invention are within the scope of the invention.

Example 1

A 500 mL three-necked round bottom flask equipped with a mechanical stirrer and a nitrogen inlet was taken, and 19.88 g (80 mmol) of 1,3-bis(3-aminopropyl)-1,1,3,3-tetramethyldisiloxane (NH Di-8), 80.7 g of N-Methyl-2-pyrrolidone (NMP), 39.68 g (160 mmol) of bicyclo[2.2.2]oct-7-ene-2,3,5,6-tetracarboxylic dianhydride (BCDA) and 12.17 g (80 mmol) of 3,5-diaminobenzoic acid (DBA) were added. After the above solution was reacted at 50 to 80° C. for 4.5 hours, 45 g of toluene was added, and the mixture was further heated to 140° C. and stirred continuously for 5.5 hours to obtain a polyimide solution SPI-1 dissolved in N-Methyl-2-pyrrolidone (NMP).

11 g of the above SPI-1 solution and 5 g of bisphenol A diglycidyl ether (1 g of which having a weight average molecular weight of 400 Da or less), 3 g of dicyclopentadiene phenol type epoxy resin (XD-1000 available from Japan Chemical Co., Ltd.), and 0.625 g of 3,3'-diaminodiphenyl sulfone (3,3'-DDS) were taken and uniformly mixed to obtain an adhesive composition-1 (AD-1). The AD-1 was coated on the substrate by a wire bar, and after 10 minutes of pre-baking procedure at 90° C. in an oven, a film having a film thickness of about 50 μm was obtained and then hard-baked at 160° C. in an oven for 2 hours to obtain a cured sheet-like adhesive. As shown in FIG. 1, the sheet-like adhesive had the following absorption peaks in the infrared spectrum: 3464 cm$^{-1}$ (N—H, amine), 3056 cm$^{-1}$ (ph-H, phenyl), 1712 cm$^{-1}$ (C=O, carbonyl).

Example 2

A 500 mL three-necked round bottom flask equipped with a mechanical stirrer and a nitrogen inlet was taken, and 9.94 g (40 mmol) of 1,3-bis(3-aminopropyl)-1,1,3,3-tetramethyldisiloxane (NH Di-8), 120.7 g of N-Methyl-2-pyrrolidone (NMP), 19.84 g (80 mmol) of bicyclo[2.2.2]oct-7-ene-2,3,5,6-tetracarboxylic dianhydride (BCDA), 41.63 g (80 mmol) of 4,4'-bisphenol A dianhydride (BPADA), and 49.26 g (120 mmol) of 2,2-bis [4-(4-aminophenoxy)phenyl] propane (BAPP) were added. After the above solution was reacted at 50 to 80° C. for 4.5 hours, 45 g of toluene was added, and the mixture was further heated to 140° C. and stirred continuously for 5.5 hours to obtain a polyimide solution SPI-2 dissolved in N-Methyl-2-pyrrolidone (NMP).

Figure 2:
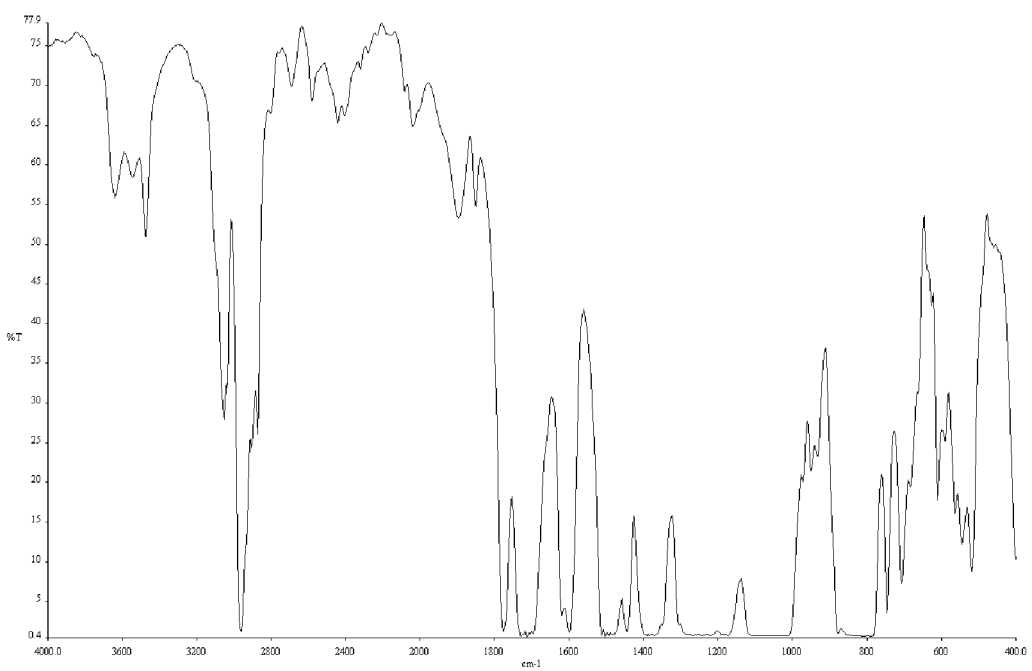
FIG. 2 is an infrared spectrum of the sheet-like adhesive of Example 2 of the present invention.

12 g of the above SPI-2 solution and 5 g of bisphenol A diglycidyl ether (1 g of which having a weight average molecular weight of 400 Da or less), and 3 g of dicyclopentadiene phenol type epoxy resin (XD-1000 available from Japan Chemical Co., Ltd.) were taken and uniformly mixed to obtain an adhesive composition-2 (AD-2). The AD-2 was coated on the substrate by a wire bar, and after 10 minutes of pre-baking procedure at 90° C. in an oven, a film having a film thickness of about 50 μm was obtained and then hard-baked at 160° C. in an oven for 2 hours to obtain a cured sheet-like adhesive. As shown in FIG. 2, the sheet-like adhesive had the following absorption peaks in the infrared spectrum: 3056 cm$^{-1}$(ph-H, phenyl), 1774 cm$^{-1}$, 1722 cm$^{-}$(C=O, imide), 1714 cm$^{-1}$ (C=O, carbonyl).

Example 3

A 500 mL three-necked round bottom flask equipped with a mechanical stirrer and a nitrogen inlet was taken, and 19.88 g (80 mmol) of 1,3-bis(3-aminopropyl)-1,1,3,3-tetramethyldisiloxane (NH Di-8), 114.2 g of N-Methyl-2-pyrrolidone (NMP), 19.84 g (80 mmol) of bicyclo[2.2.2]oct-7-ene-2,3,5,6-tetracarboxylic dianhydride (BCDA), 41.63 g (80 mmol) of 4,4'-bisphenol A dianhydride (BPADA), and 32.84 g (80 mmol) of 2,2-bis [4-(4-aminophenoxy)phenyl] propane (BAPP) were added. After the above solution was reacted at 50 to 80° C. for 4.5 hours, 45 g of toluene was added, and the mixture was further heated to 140° C. and stirred continuously for 5.5 hours to obtain a polyimide solution SPI-3 dissolved in N-Methyl-2-pyrrolidone.

Figure 3:
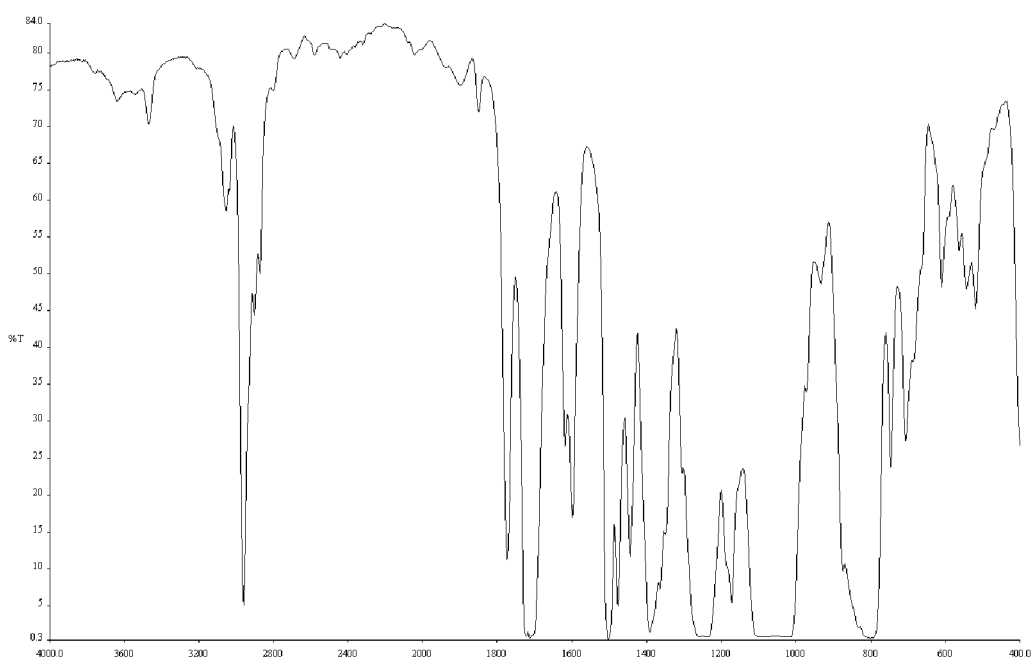
FIG. 3 is an infrared spectrum of the sheet-like adhesive of Example 3 of the present invention.

11 g of the above SPI-3 solution and 5 g of bisphenol A diglycidyl ether (1 g of which having a weight average molecular weight of 400 Da or less), and 3 g of dicyclopentadiene phenol type epoxy resin (XD-1000 available from Japan Chemical Co., Ltd.) were taken and uniformly mixed to obtain an adhesive composition-3 (AD-3). The AD-3 was coated on the substrate by a wire bar, and after 10 minutes of pre-baking procedure at 90° C. in an oven, a film having a film thickness of about 50 μm was obtained and then hard-baked at 160° C. in an oven for 2 hours to obtain a cured sheet-like adhesive. As shown in FIG. 3, the sheet-like adhesive had the following absorption peaks in the infrared spectrum: 3056 cm$^{-1}$ (ph-H, phenyl), 1774 cm$^{-1}$, 1722 cm$^{-1}$(C=O, imide), 1714 cm$^{-1}$(C=O, carbonyl).

Example 4

A 500 mL three-necked round bottom flask equipped with a mechanical stirrer and a nitrogen inlet was taken, and 19.88 g (80 mmol) of 1,3-bis(3-aminopropyl)-1,1,3,3-tetramethyldisiloxane (NH Di-8), 92.4 g of N-Methyl-2-pyrrolidone (NMP), 39.68 g (160 mmol) of bicyclo[2.2.2]oct-7-ene-2,3,5,6-tetracarboxylic dianhydride (BCDA) and 32.84 g (80 mmol) of 2,2-bis[4-(4-aminophenoxy)phenyl] propane (BAPP) were added. After the above solution was reacted at 50 to 80° C. for 4.5 hours, 45 g of toluene was added, and the mixture was further heated to 140° C. and stirred continuously for 5.5 hours to obtain a polyimide solution SPI-4 dissolved in N-Methyl-2-pyrrolidone (NMP).

11 g of the above SPI-4 solution and 5 g of bisphenol A diglycidyl ether (1 g of which having a weight average molecular weight of 400 Da or less), 3 g of dicyclopentadiene phenol type epoxy resin (XD-1000 available from Japan Chemical Co., Ltd.), and 0.625 g of 3,3'-diaminodiphenyl sulfone (3,3'-DDS) were taken and uniformly mixed to obtain an adhesive composition-4 (AD-4). The AD-4 was coated on the substrate by a wire bar, and after 10 minutes of pre-baking procedure at 90° C. in an oven, a film having a film thickness of about 50 μm was obtained and then hard-baked at 160° C. in an oven for 2 hours to obtain a cured sheet-like adhesive. The sheet-like adhesive had the following absorption peaks in the infrared spectrum: 3464 cm$^{-1}$ (N—H, amine), 3056 cm$^{-1}$(ph-H, phenyl), 1712 cm$^{-1}$ (C=O, carbonyl).

Example 5

11 g of the polyimide solution SPI-1 dissolved in N-Methyl-2-pyrrolidone (NMP) from Example 1 and 5 g of bisphenol A diglycidyl ether (1 g of which having a weight average molecular weight of 400 Da or less), 3 g of dicyclopentadiene phenol type epoxy resin (XD-1000 available from Japan Chemical Co., Ltd.), 0.625 g of 3,3'-diaminodiphenyl sulfone (3,3'-DDS), and 1.1 g of silicon dioxide were taken and uniformly mixed to obtain an adhesive composition-5 (AD-5). The AD-5 was coated on the substrate by a wire bar, and after 10 minutes of pre-baking procedure at 90° C. in an oven, a film having a film thickness of about 50 μm was obtained and then hard-baked at 160° C. in an oven for 2 hours to obtain a cured sheet-like adhesive.

Example 6

11 g of the polyimide solution SPI-1 dissolved in N-Methyl-2-pyrrolidone (NMP) from Example 1 and 5 g of bisphenol A diglycidyl ether (1 g of which having a weight average molecular weight of 400 Da or less), 3 g of dicyclopentadiene phenol type epoxy resin (XD-1000 available from Japan Chemical Co., Ltd.), 0.625 g of 3,3'-diaminodiphenyl sulfone (3,3'-DDS), and 3.9 g of boron nitride were taken and uniformly mixed to obtain an adhesive composition-6 (AD-6). The AD-6 was coated on the substrate by a wire bar, and after 10 minutes of pre-baking procedure at 90° C. in an oven, a film having a film thickness of about 50 μm was obtained and then hard-baked at 160° C. in an oven for 2 hours to obtain a cured sheet-like adhesive.

Example 7

11 g of the polyimide solution SPI-1 dissolved in N-Methyl-2-pyrrolidone (NMP) from Example 1 and 5 g of bisphenol A diglycidyl ether (1 g of which having a weight average molecular weight of 400 Da or less), 3 g of dicyclopentadiene phenol type epoxy resin (XD-1000 available from Japan Chemical Co., Ltd.), 0.625 g of 3,3'-diaminodiphenyl sulfone (3,3'-DDS), and 4.4 g of mica powder were taken and uniformly mixed to obtain an adhesive composition-7 (AD-7). The AD-7 was coated on the substrate by a wire bar, and after 10 minutes of pre-baking procedure at 90° C. in an oven, a film having a film thickness of about 50 μm was obtained and then hard-baked at 160° C. in an oven for 2 hours to obtain a cured sheet-like adhesive.

Comparative Example 1

A 500 mL three-necked round bottom flask equipped with a mechanical stirrer and a nitrogen inlet was taken, and 16.02 g (80 mmol) of 4,4'-Oxydianiline (ODA), 57 g of N-Methyl-2-pyrrolidone (NMP), 19.84 g (80 mmol) of bicyclo[2.2.2]oct-7-ene-2,3,5,6-tetracarboxylic dianhydride (BCDA), and 22.9 g (80 mmol) of 5,5'-Methylenebis(2-amino-benzoic-acid) (MBAA) were added. After the above solution was reacted at 50 to 80° C. for 4.5 hours, a polyimide solution SPI-8 dissolved in NMP was obtained.

11 g of the above SPI-8 solution and 5 g of bisphenol A diglycidyl ether (1 g of which having a weight average molecular weight of 400 Da or less), and 3 g of dicyclopentadiene phenol type epoxy resin (XD-1000 available from Japan Chemical Co., Ltd.) were taken and uniformly mixed to obtain an adhesive composition-8 (AD-8). The AD-8 was coated on the substrate by a wire bar, and after 10 minutes of pre-baking procedure at 90° C. in an oven, a film having a film thickness of about 50 μm was obtained and then hard-baked at 300° C. in an oven for 2 hours to obtain a cured sheet-like adhesive.

Comparative Example 2

A 500 mL three-necked round bottom flask equipped with a mechanical stirrer and a nitrogen inlet was taken, and 19.88 g (80 mmol) of 1,3-bis(3-aminopropyl)-1,1,3,3-tetramethyldisiloxane (NH Di-8), 75.92 g of N-Methyl-2-pyrrolidone (NMP), 42.9 g (160 mmol) of 1,4,5,8-Naphthalenetetracarboxylic dianhydride (NTCDA), and 22.9 g (80 mmol) of 5,5'-Methylenebis(2-amino-benzoic-acid) (MBAA) were added. After the above solution was reacted at 50 to 80° C. for 4.5 hours, 45 g of toluene was added, and the mixture was further heated to 140° C. and stirred continuously for 5.5 hours to obtain a polyimide solution SPI-9 dissolved in N-Methyl-2-pyrrolidone (NMP).

11 g of the above SPI-9 solution and 5 g of bisphenol A diglycidyl ether (1 g of which having a weight average molecular weight of 400 Da or less), and 3 g of dicyclopentadiene phenol type epoxy resin (XD-1000 available from Japan Chemical Co., Ltd.) were taken and uniformly mixed to obtain an adhesive composition-9 (AD-9). The AD-9 was coated on the substrate by a wire bar, and after 10 minutes of pre-baking procedure at 90° C. in an oven, a film having a film thickness of about 50 μm was obtained and then hard-baked at 160° C. in an oven for 2 hours to obtain a cured sheet-like adhesive.

Comparative Example 3

A 500 mL three-necked round bottom flask equipped with a mechanical stirrer and a nitrogen inlet was taken, and 19.88 g (80 mmol) of 1,3-bis(3-aminopropyl)-1,1,3,3-tetramethyldisiloxane (NH Di-8), 80.7 g of N-Methyl-2-pyrrolidone (NMP), 39.68 g (160 mmol) of Bicyclo[2.2.2]oct-7-ene-2,3,5,6-tetracarboxylic dianhydride (BCDA), and 12.17 g (80 mmol) of 3,5-Diaminobenzoic acid (DBA) were added. After the above solution was reacted at 50 to 80° C. for 4.5 hours, 45 g of toluene was added, and the mixture was further heated to 140° C. and stirred continuously for 5.5 hours to obtain a polyimide solution SPI-10 dissolved in N-Methyl-2-pyrrolidone.

11 g of the above SPI-10 solution and 8 g of bisphenol A diglycidyl ether (1.5 g of which having a weight average molecular weight of 400 Da or less), 4 g of dicyclopentadiene phenol type epoxy resin (XD-1000 available from Japan Chemical Co., Ltd.), and 0.625 g of 3,3'-diaminodiphenyl sulfone (3,3'-DDS) were taken and uniformly mixed to obtain an adhesive composition-10 (AD-10). The AD-10 was coated on the substrate by a wire bar, and after 10 minutes of pre-baking procedure at 90° C. in an oven, a film having a film thickness of about 50 μm was obtained and then hard-baked at 160° C. in an oven for 2 hours to obtain a cured sheet-like adhesive.

Comparative Example 4

A 500 mL three-necked round bottom flask equipped with a mechanical stirrer and a nitrogen inlet was taken, and 19.88 g (80 mmol) of 1,3-bis(3-aminopropyl)-1,1,3,3-tetramethyldisiloxane (NH Di-8), 80.7 g of N-Methyl-2-pyrrolidone (NMP), 39.68 g (160 mmol) of Bicyclo[2.2.2]oct-7-ene-2,3,5,6-tetracarboxylic dianhydride (BCDA), and 12.17 g (80 mmol) of 3,5-Diaminobenzoic acid (DBA) were added. After the above solution was reacted at 50 to 80° C. for 4.5 hours, 45 g of toluene was added, and the mixture was further heated to 140° C. and stirred continuously for 5.5 hours to obtain a polyimide solution SPI-11 dissolved in N-Methyl-2-pyrrolidone.

11 g of the above SPI-1 solution and 5 g of bisphenol A diglycidyl ether (0 g of which having a weight average molecular weight of 400 Da or less), 3 g of dicyclopentadiene phenol type epoxy resin (XD-1000 available from Japan Chemical Co., Ltd.), and 0.625 g of 3,3'-diaminodiphenyl sulfone (3,3'-DDS) were taken and uniformly mixed to obtain an adhesive composition-11 (AD-11). The AD-11 was coated on the substrate by a wire bar, and after 10 minutes of pre-baking procedure at 90° C. in an oven, a film having a film thickness of about 50 μm was obtained and then hard-baked at 160° C. in an oven for 2 hours to obtain a cured sheet-like adhesive.

Glass Transition Temperature

The sheet-like adhesives of Examples 1 to 5 and Comparative Examples 1 to 3 were subjected to a glass transition temperature test. The test was carried out using DSC (PerkinElmer Pyris 6 DSC) at 50-400° C. and a heating rate of 10° C./min. The results obtained are shown in Table 1.

Percentage of Polyimide

The percentages of the polyimides of Examples 1 to 4 and Comparative Examples 1 to 4 are shown in Table 1. The percentage of polyimide refers to the weight percentage of polyimide weight ($W_{polymide\ solid}$) to the total amount of epoxy resin ($W_{epoxy\ resin}$), and the formula is as follows:

$$\%_{polyimide}=(W_{polyimide}/W_{epoxy\ resin})\times100\%$$

The polyimide weight can be obtained by conversion of the solid content.

The solid content ($\%_{solid}$) is measured by taking an appropriate weight of the colloid, weighing the total weight ($W_{total}$), baking at 200° C. for 90 minutes, and weighing again after baking to obtain the solid weight ($W_{solid}$), and then the solid content can be calculated by the following formula:

$$\%_{solid}=(W_{solid}/W_{total})\times100\%$$

Taking the adhesive composition-1 (AD-1) of Example 1 as an example, 11 g of polyimide (a solid content of 50%) was added with 8 g of epoxy resin, so the percentage of polyimide ($\%_{polyimide}$) can be calculated as (11*0.5)/8=68.75%.

Thermal Expansion Coefficient

The measurement was carried out using a PerkinElmer Diamond TMA instrument at a measurement temperature of 50 to 400° C. and a heating rate of 10° C./min. The test results are shown in Table 2.

Thermal Conductivity

The ASTM D5470 test method was used, and the test results are shown in Table 2.

Breakdown Voltage Test

The measurement was carried out using a 7100 Series Hipot/Insulation Tester with a DCW test, and the voltage is from 300V to 6000V. The test results are shown in Table 2.

Dead Fold Test

The sheet-like adhesive was bent 180 degrees, and a pressure of 0.2 kg was applied thereto for 60 seconds. The sheet-like adhesive was further flattened, and a pressure of 0.2 kg was applied thereto for 60 seconds. It was passed if the surface didn't break, and it's not passed if the surface was cracked.

TABLE 1

| Adhesive | Diamine | Dianhydride | Percentage of polyimide (wt %) | Percentage of the epoxy resin having a weight average molecular weight of 400 Da or less (wt %) | Glass transition temp. | Dead fold test |
|---|---|---|---|---|---|---|
| Example 1 | NH Di-8, DBA | BCDA | 68.75 | 12.5 | 118° C. | Passed |
| Example 2 | NH Di-8, BAPP | BCDA, BPADA | 75 | 12.5 | 150° C. | Passed |
| Example 3 | NH Di-8, BAPP | BCDA, BPADA | 68.75 | 12.5 | 100° C. | Passed |
| Example 4 | NH Di-8, BAPP | BCDA | 68.75 | 12.5 | 105° C. | Passed |
| Comparative Example 1 | ODA, MBAA | BCDA | 68.75 | 12.5 | 289° C. | Not passed |
| Comparative Example 2 | NH Di-8, MBAA | NTCDA | 68.75 | 12.5 | 235° C. | Not passed |
| Comparative Example 3 | NH Di-8, DBA | BCDA | 45.8 | 12.5 | 88° C. | Passed |
| Comparative Example 4 | NH Di-8, DBA | BCDA | 68.75 | 0 | 101 | Not passed |

TABLE 2

| Adhesive | Diamine | Dianhydride | Filler | Glass transition temp. | Thermal expansion coefficient (ppm/° C.) | Thermal conductivity (W/m · K) | Breakdown voltage test (V) |
|---|---|---|---|---|---|---|---|
| Example 1 | NH Di-8, DBA | BCDA | None | 118° C. | 293 | 0.15 | 3000 |
| Example 5 | NH Di-8, MBAA | BCDA | Silicon dioxide | 118° C. | 70 | 0.16 | 3000 |
| Example 6 | NH Di-8, MBAA | BCDA | Boron nitride | 118° C. | 285 | 0.55 | 3000 |
| Example 7 | NH Di-8, MBAA | BCDA | Mica powder | 118° C. | 131 | 0.15 | 6000 |

From the results shown in Table 1, it is understood that the adhesives of Examples 1 to 4 have a glass transition temperature from 100° C. to 150° C., which is superior in glass transition temperature to the rubber-based and acrylic-based adhesives. Further, by adjusting the content of the epoxy resin having a low molecular weight (weight average molecular weight of 400 Da or less) in the epoxy resin in the adhesive composition, the adhesive formed can have a good bending property.

It can be seen from the results shown in Table 2 that the properties of the adhesive of the present invention can be adjusted by adding different fillers. In Example 5, the coefficient of thermal expansion can be effectively reduced by the addition of silicon dioxide; in Example 6, the thermal conductivity can be effectively improved by the addition of boron nitride; and in Example 7, the withstanding voltage property of the adhesive can be improved by the addition of mica powder.

It can be seen from the above that the adhesive composition of the present invention can further enhance the other properties of the formed adhesive by adding the inorganic filler while maintaining a high glass transition temperature, thereby greatly improving the applicability thereof.

OTHER IMPLEMENTATION ASPECTS

All features disclosed in this disclosure can be combined in any manner. Features disclosed in this specification can be replaced with features of the same, equivalent or similar purpose. Therefore, in addition to the special statement, the feature disclosed in this specification is one example of a series of equivalent or similar features.

In addition, according to the disclosure of the present specification, those skilled in the art can easily make appropriate changes and modifications to different methods and situations according to the basic features of the present invention without departing from the spirit and scope of the present invention. Therefore, other implementation aspects are also included in the appending claims.

What is claimed is:

1. An adhesive composition, comprising an epoxy resin; and a polyimide comprising a repeating unit, wherein the adhesive composition contains no curing agent, and the repeating unit comprises a first repeating unit represented by formula (1) and a second repeating unit represented by formula (2):

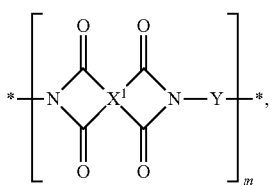

(1)

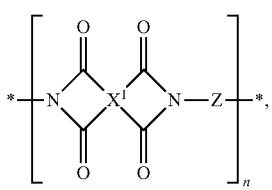

(2)

wherein m and n are each independently an integer of 1 to 300, m+n is an integer of 2 to 300, and each $X^1$ is independently a tetravalent organic group having an alicyclic group in a main chain moiety, Y of formula (1) is a divalent organic group containing a siloxane group in a main chain moiety, Z of formula (2) is a divalent organic group containing a phenolic hydroxyl group or a carboxyl group in a side chain, "*" indicates a linking point, the weight ratio of polyimide to the total amount of the epoxy resin is 50% to 100%, and wherein the epoxy resin containing a portion of the epoxy resin having a weight average molecular weight of less than 400 Da accounts for 12 to 40% by weight of the total amount of the epoxy resin.

2. The adhesive composition of claim 1, wherein the repeating unit further comprises a third repeating unit represented by formula (3), a fourth repeating unit represented by formula (4), or both the third repeating unit represented by formula (3) and the fourth repeating unit represented by formula (4):

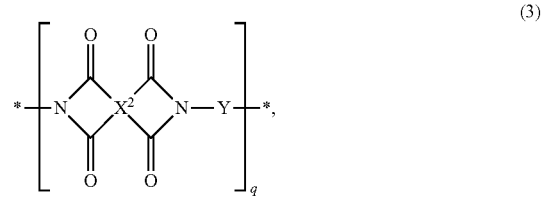

(3)

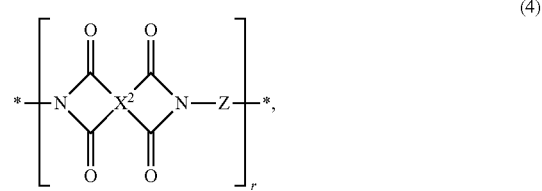

(4)

wherein q and r are each independently an integer of 0 to 300, q+r is an integer of 1 to 300, each $X^2$ is independently a tetravalent organic group having an aromatic ring structure in a main chain moiety, Y of formula (3) is a divalent organic group containing a siloxane group in a main chain moiety, Z of formula (4) is

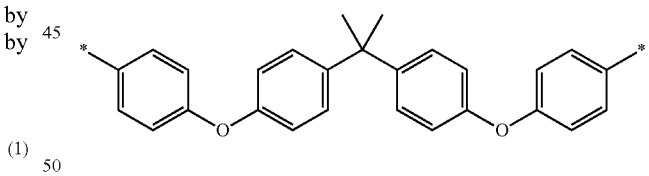

or a divalent organic group containing a phenolic hydroxyl group or a carboxyl group in a side chain, and "*" indicates a linking point.

3. The adhesive composition of claim 2, wherein each $X^2$ is independently selected from

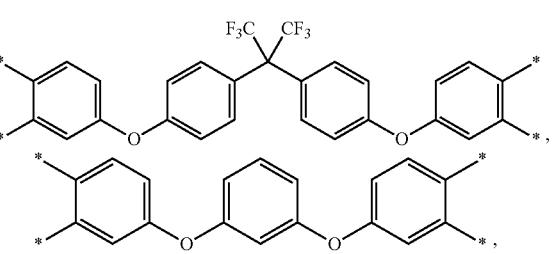

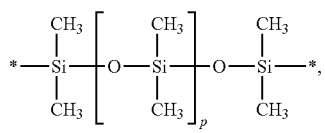

wherein p is an integer of 0 to 20, and "*" indicates a linking point.

6. The adhesive composition of claim 2, wherein each Z is independently selected from

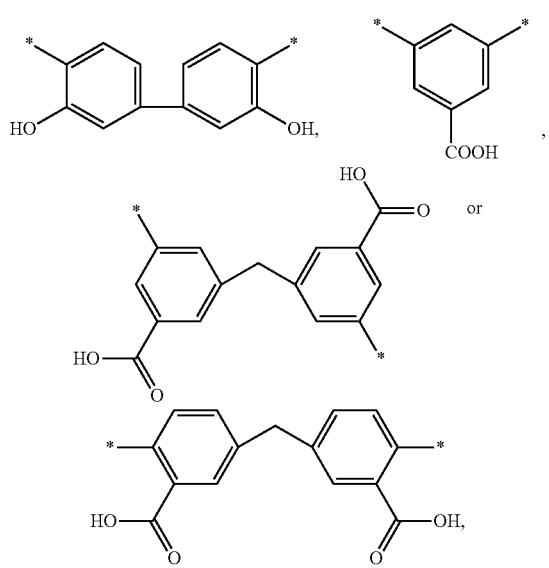

wherein "*" indicates a linking point.

7. The adhesive composition of claim 2, wherein the epoxy resin is selected from

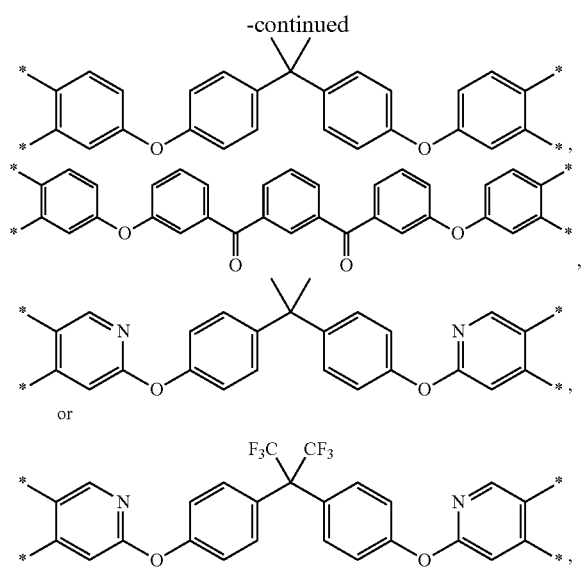

wherein "*" indicates a linking point.

4. The adhesive composition of claim 2, wherein each $X^1$ is independently selected from

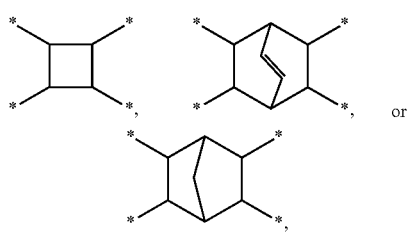

wherein "*" indicates a linking point.

5. The adhesive composition of claim 2, wherein each Y is independently selected from

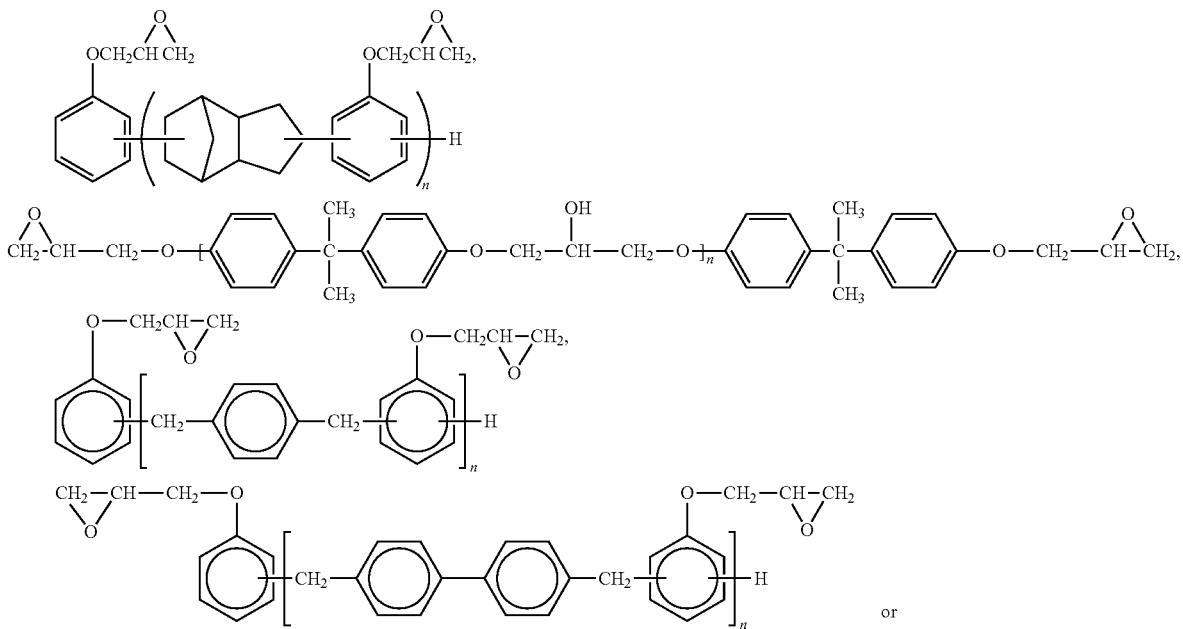

-continued

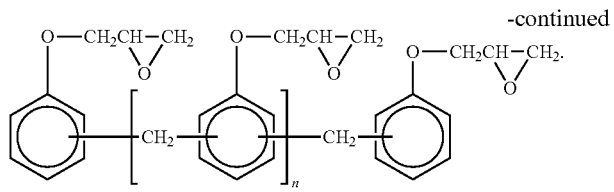

wherein n is an integer of 1 to 30.

8. The adhesive composition of claim 2, wherein further comprising an inorganic filler.

9. The adhesive composition of claim 1, wherein each $X^1$ is independently selected from

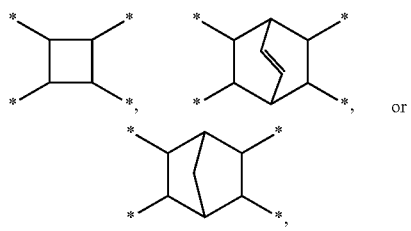

wherein "*" indicates a linking point.

10. The adhesive composition of claim 1, wherein each Y is independently selected from

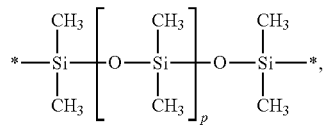

wherein p is an integer of 0 to 20, and "*" indicates a linking point.

11. The adhesive composition of claim 1, wherein each Z is independently selected from

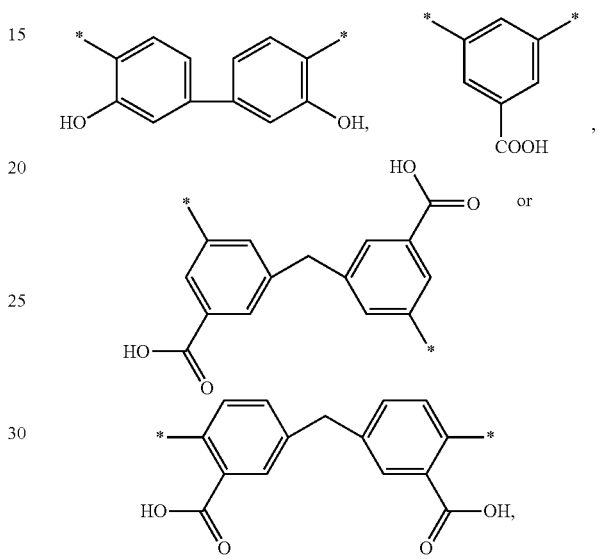

wherein "*" indicates a linking point.

12. The adhesive composition of claim 1, wherein the epoxy resin is selected from

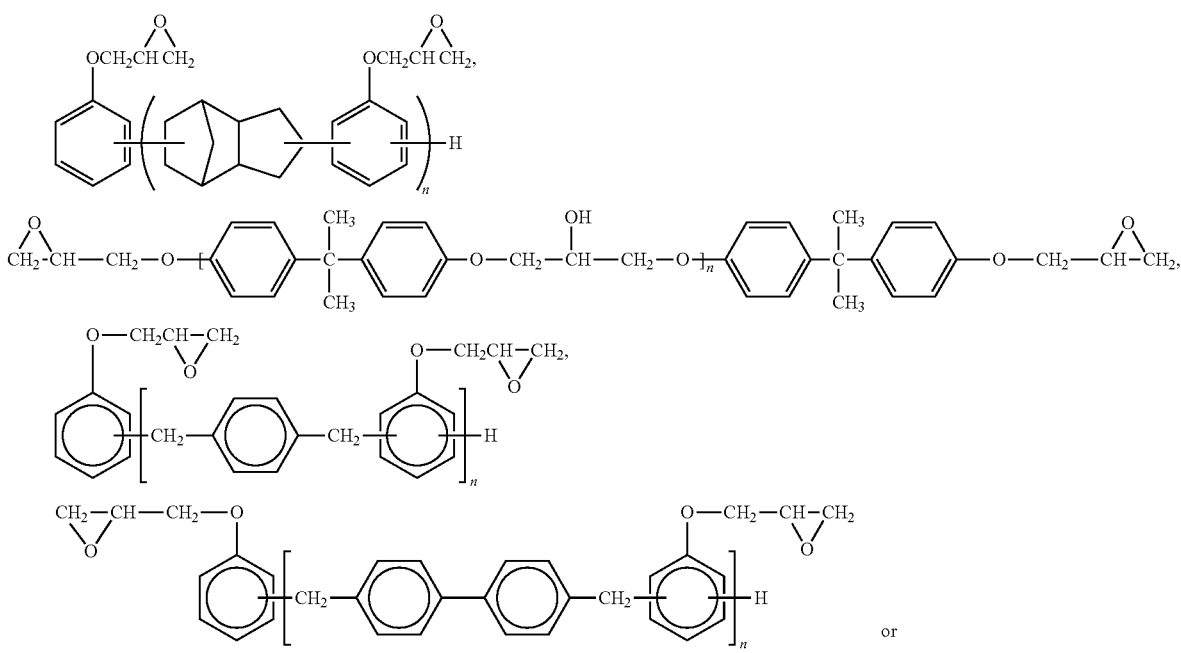

-continued

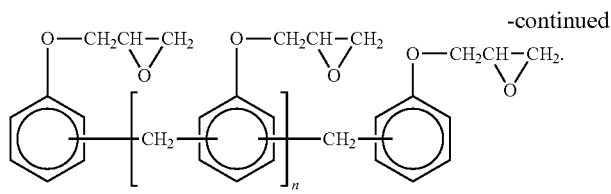

wherein is an integer of 1 to 30.

13. The adhesive composition of claim 1, wherein further comprising an inorganic filler.

14. The adhesive composition of claim 13, wherein the inorganic filler is selected from silicon dioxide, boron nitride, mica or aluminum hydroxide.

15. An adhesive formed by the adhesive composition of claim 1.

16. The adhesive of claim 15, being in the form of a sheet or a film.

17. A cured product formed by curing the adhesive composition of claim 1.

* * * * *